US007219125B1

(12) United States Patent
Day

(10) Patent No.: US 7,219,125 B1
(45) Date of Patent: May 15, 2007

(54) METHOD AND APPARATUS FOR MASKING VERSION DIFFERENCES IN APPLICATIONS USING A DATA OBJECT EXCHANGE PROTOCOL

(75) Inventor: Mark Day, Milton, MA (US)

(73) Assignee: Cisco Technology, Inc., San Jose, CA (US)

( * ) Notice: Subject to any disclaimer, the term of this patent is extended or adjusted under 35 U.S.C. 154(b) by 825 days.

(21) Appl. No.: 10/075,963

(22) Filed: Feb. 13, 2002

(51) Int. Cl.
*G06F 15/16* (2006.01)
(52) U.S. Cl. .................. 709/203; 703/224; 703/228; 717/121; 717/170
(58) Field of Classification Search ........ 709/201–203, 709/223–224, 227–228, 230, 217, 219; 717/120, 717/121, 170
See application file for complete search history.

(56) References Cited

U.S. PATENT DOCUMENTS

| 6,092,100 | A * | 7/2000 | Berstis et al. ............ 709/203 |
| 6,584,459 | B1 * | 6/2003 | Chang et al. .................. 707/3 |
| 6,678,717 | B1 * | 1/2004 | Schneider .................. 709/203 |
| 6,732,175 | B1 * | 5/2004 | Abjanic .................... 709/227 |
| 6,748,591 | B1 * | 6/2004 | Lewallen .................. 717/170 |
| 6,772,206 | B1 * | 8/2004 | Lowry et al. ............... 709/223 |
| 6,792,611 | B2 * | 9/2004 | Honishi et al. ............. 719/328 |
| 6,865,605 | B1 * | 3/2005 | Soderberg et al. .......... 709/226 |
| 6,882,996 | B2 * | 4/2005 | Preisig et al. ................. 707/4 |
| 6,904,600 | B1 * | 6/2005 | James et al. ............... 719/328 |
| 7,035,921 | B1 * | 4/2006 | Baker ....................... 709/203 |
| 2002/0073399 | A1 * | 6/2002 | Golden ...................... 717/114 |
| 2002/0116205 | A1 * | 8/2002 | Ankireddipally et al. ...... 705/1 |
| 2002/0124113 | A1 * | 9/2002 | Gargya et al. ............ 709/246 |
| 2002/0174178 | A1 * | 11/2002 | Stawikowski ............. 709/203 |
| 2003/0074482 | A1 * | 4/2003 | Christensen et al. ........ 709/313 |
| 2004/0199636 | A1 * | 10/2004 | Brown et al. .............. 709/227 |

OTHER PUBLICATIONS

"Simple Object Access Protocol Version 1.1," http://w3.org/tr/soap/Simple_Object_Access_Protocol_1_1.htm, W3 Consortium, May 8, 2000.
"XML Envelope Schema," http://schemas.xmlsoap.org/soap/envelope, W3 Consortium, 2001.
"Introduction to TLS," Netscape Communications Corp., http://developer.netscape.com/docs/manuals/security/sslin/contents.htm, 1998.
E. Rescorla, "HTTP Over TLS," IETF RFC 2818, May 2000.
R. Khare et al., "Upgrading to TLS Within HTTP/1.1," IETF RFC 2817, May 2000.
A. Medvinsky et al., "Addition of Kerberos Cipher Suites to Transport Layer Security (TLS)," IETF RFC 2712, Oct. 1999.
T. Dierks et al., "The TLS Protocol Version 1.0," IETF RFC 2246, Jan. 1999.

* cited by examiner

*Primary Examiner*—Ario Etienne
*Assistant Examiner*—Van Nguyen
(74) *Attorney, Agent, or Firm*—Hickman Palermo Truong & Becker LLP

(57) ABSTRACT

Techniques for masking version differences among multiple applications providing similar services over a network include receiving, at an application-switching component, from a requesting process, a request for a service among the similar services. The request includes data indicating a particular service extension is mandatory. The request is sent to a first application. In response to sending the request to the first application, error data is received. The error data indicates the particular service extension is not available at the first application. In response to receiving the error data, the request is sent by the application-switching component to a different application of the multiple applications. These techniques allow a provider of multiple servers to prevent a Simple Object Access Protocol (SOAP) mustUnderstand error, indicating a lack of a mandatory extension, from being sent to a client when at least one of the servers includes the extension.

21 Claims, 3 Drawing Sheets

METHOD AND APPARATUS FOR MASKING VERSION DIFFERENCES IN APPLICATIONS USING A DATA OBJECT EXCHANGE PROTOCOL

FIELD OF THE INVENTION

The present invention generally relates to protocols for exchanging data objects between separately developed computer software applications. The invention relates more specifically to techniques for masking version differences in such applications using a data object exchange protocol.

BACKGROUND OF THE INVENTION

Markup languages are used to describe data by including tags that distinguish information about the data from the data itself. A client process ("client") executing on one node of the network employs network protocols to send a request message in the markup language to a server process ("server") executing on another node. The server responds to the request by providing a service and often employs the network protocols to return a response message in the markup language to the client. The messages are addressed to the proper process on the proper node based on a system for naming the processes on the network. For example, the Universal Resource Identifier (URI) names the node (domain) where a process executes and a directory where a particular executable file resides on that domain.

Extensible Markup Language (XML) provides a common syntax for expressing structure in data. Structured data refers to data that is tagged for its content, meaning, or use. XML provides an expansion of the tagging that is done in Hypertext Markup Language (HTML) and the related Structured Generalized Markup Language (SGML), which focus on format or presentation. In XML the meaning (semantics) of the data can be provided as well as the presentation format. Many applications employ proprietary implementations of XML to communicate between a server and a client. Simple Object Access Protocol (SOAP) is a proposed implementation of XML for exchanging data objects between two processes or "communicating parties" that are independently developed, as described in Simple Object Access Protocol 1_1.htm on the Web at domain and directory w3.org/TR/SOAP, hereinafter referenced as SOAP1.1.

A SOAP message is an XML document that includes a mandatory SOAP envelope, an optional SOAP header, and a mandatory SOAP body. There is a fairly strong similarity between these SOAP elements and the elements of a letter in a postal service. The SOAP envelope, as with a letter's envelope, serves as the unit of transport. The SOAP body, like a letter's contents, is to be carried without being examined or changed. And the SOAP header, like the outside surface of a letter's envelope, is available for various marks or annotations that can affect transport and delivery without disturbing the contents. The invention is related to the use of these markers in the SOAP header The names and attributes of the standard SOAP message elements are defined by an XML schema stored on domain schemas.xmlsoap.org in directory /soap/envelope. The SOAP envelope is the top level XML element of the schema; it is named "Envelope." The optional SOAP header is an optional child element of Envelope and is named "Header." The SOAP body is a mandatory child element of Envelope and is named "Body." The data objects sent between the communicating parties are included in the SOAP Body.

For example, assume that a user purchases and installs a personal stock portfolio (PSP) application to run on the user's computer. The user also registers with a stock quotation service provided by Company XYZ over the Internet. Company XYZ executes a stock quotation (SQ) application, which retrieves data from the stock markets and answers requests for data from one or more PSP applications. The PSP application on the user's computer communicates with the SQ application on the Company XYZ computer using Internet protocols. Inside the packets transported over the Internet are SOAP messages for passing data objects that describe stock prices between the PSP application and the SQ application. The stock price object type is described and values for one or more stock price objects, which are instances of the stock price object type, are included in a SOAP body of the SOAP message. The PSP and SQ applications are the client and server communicating parties, respectively, in this example.

The PSP application sends a SOAP message to the SQ application that includes a list of stock ID objects in the SOAP Body. Each stock ID object is an instance of a stock ID type. In response, the SQ determines the prices of those stocks identified by the stock ID objects and sends a SOAP message to the PSP application that includes a list of stock price objects in the SOAP Body.

SOAP allows each of the independently developed communicating parties to change under continued development. The Header element of a SOAP message includes one or more child elements called header entries. Each header entry has a name and corresponds to an extension of the contents or meaning of the data in the SOAP message beyond the contents or meaning originally established for the communicating parties. Each header entry element includes two attributes, an actor attribute and a mustUnderstand attribute. The actor attribute identifies the recipient for whom the extension is intended, identified by the recipient's URI.

The mustUnderstand attribute is set to "1" to indicate that the recipient must be configured to process the extension corresponding to the header entry. The mustUnderstand attribute is set to a different value if the recipient can ignore the extension. If a recipient receives a SOAP message with an extension having a mustUnderstand value of "1" and the recipient is not configured for that extension, the recipient must respond with an error message. That is, an application that does not modify the use of data in the SOAP message based on a header entry with a mustUnderstand attribute of "1" must return an error to the application that sent the SOAP message. This provides a flexible mechanism for extending a message in a decentralized and modular way, without prior knowledge between the communicating parties.

For example, assume that the user upgrades from a PSPversion1 application to a PSPversion2 application obtained from Company ABC. The PSPversion2 application includes, in the SOAP Body of the SOAP message sent to a SQ application, a list of stock price objects instead of a list of stock ID objects. Each stock price object includes a stock ID object that identifies the stock. Each stock price object also includes the price obtained the last time the PSP application requested the price for that stock. The PSPversion2 application is designed to work with a revised SQ application, SQversion2, which automatically sends additional information for stocks ("threshold stocks") that have changed more than a threshold amount since the last time the PSP application requested stock prices.

To indicate this change to the SOAP message transmitted to the SQ application, a header entry is added to the Header element of the SOAP message. For example, the header entry is named "Threshold" and the mustUnderstand attribute of the header entry is set to "1." An SQ application that does not modify the use of data in the SOAP message based on the header entry "Threshold" will not perform properly. For example, such an SQ application would not be expected to retrieve the stock ID from a stock price object in the SOAP request instead of from a stock ID object in the SOAP request. Such an application must return to the PSPversion2 application a SOAP error message indicating that the SQ application cannot process the request in the SOAP message. On receiving the mustUnderstand error, the PSPversion2 application can fall back to sending a message that would be sent by the PSPversion1 application to the SQversion1 application.

These problems also may arise in the specific context of network hardware and software that performs application-switching or content-switching functions, such as with content switching products formerly commercially available from Arrowpoint and now commercially available from Cisco Systems, Inc., San Jose, Calif.

Based on the foregoing, there is a clear need for techniques for masking version differences in applications that use a data object exchange protocol.

In particular, there is a need for techniques for masking mustUnderstand errors arising in applications that exchange data objects using SOAP.

There is also a specific need for techniques for masking mustUnderstand errors arising in applications that are switched by a content services switch or equivalent device.

SUMMARY OF THE INVENTION

The foregoing needs, and other needs and objects that will become apparent from the following description, are achieved in the present invention, which comprises, in one aspect, a method for masking version differences among multiple applications providing similar services over a network. The method includes receiving, at an application-switching component, from a requesting process, a request for a service among the similar services. In this context, an application-switching component may comprise a content switch, load balancer, or the equivalent. The request includes data indicating a particular service extension is mandatory. The request is sent to a first application. In response to sending the request to the first application, error data is received. The error data indicates the particular service extension is not available at the first application. In response to receiving the error data, the request is sent from the application-switching component to a different application of the multiple applications.

In other aspects, the invention encompasses a computer apparatus and a computer readable medium configured to carry out the foregoing steps.

These techniques allow a provider of multiple servers to prevent an error indicating a lack of a mandatory extension, such as a Simple Object Access Protocol (SOAP) mustUnderstand error, from being sent to a client when at least one of the servers includes the extension.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for masking version differences among applications providing similar services is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

To illustrate the use of multiple applications to provide similar services, it is assumed that clients and servers are communicating using messages formatted according to the Simple Object Access Protocol (SOAP) and that SOAP messages are included in data packets transmitted using the Transport Control Protocol and the Internet Protocol (TCP/IP). Embodiments of the invention are not limited to this context, but may use other data packet protocols than TCP/IP and other data object exchange protocols than SOAP. The data object exchange protocol is assumed to have a mechanism to determine that a particular service extension, which is associated with the similar services provided by the servers, is mandatory.

Structural Overview

Figure 1:
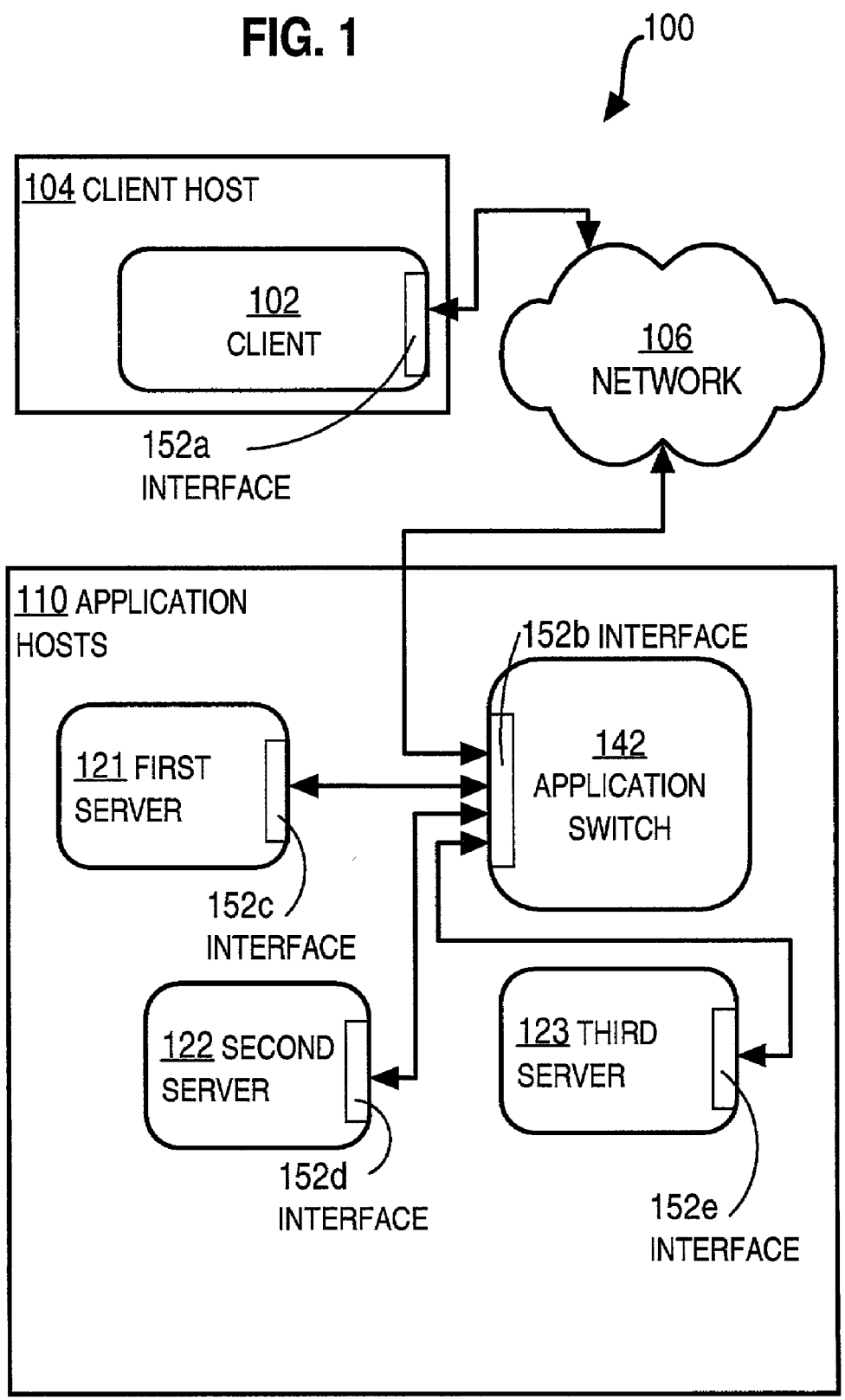
FIG. 1 is a block diagram that illustrates an overview of a system with multiple applications providing similar services, according to an embodiment.

FIG. 1 is a block diagram that illustrates an overview of a system 100 with multiple applications providing similar services, according to an embodiment. The applications providing the similar service are the first server 121, the second server 122, and the third server 123 executing on one or more application hosts 110. In other embodiments, more or fewer servers provide similar services. Servers 121, 122, 123 may execute in a single host, as illustrated in the example of FIG. 1, or may have separate hosts that are communicatively coupled, as by one or more local networks, wide area networks, or internetworks.

A client 102 executing on the client host 104 requests the service. The request is transmitted over a network 106. In one embodiment, network 106 is a packet-switched data network, such as the Internet, and the request is transmitted using a transport and network protocol, such as TCP/IP or HTTP/IP. However, embodiments are applicable to any network context and any transport protocol.

The client and servers exchange data using a data object exchange protocol represented by interfaces 152a, 152b, 152c, 152d, 152e on each client and server. Client 102 includes interface 152a; and first, second and third servers 121, 122, 123 include interfaces 152c, 152d, 152e, respectively. In the example embodiment, the interface 152 represents the routines that process SOAP messages to implement SOAP. For purposes of illustrating a simple and clear example, FIG. 1 shows one client host 102 and three servers 121, 122, 123; however, in a practical embodiment, there may be any number of clients and servers.

An application switch 142 with interface 152b is provided to mitigate data object exchange between the client 102 and the servers 121, 122, 123. The application switch is a process implemented in hardware or software or some combination of hardware and software. Hardware components are described in a later section. The application switch 142 sends the request from client 102 to the servers 121, 122, 123 in such a manner as to mask from the client 102 errors caused by sending a request to a server that does not support a service extension requested by the client 102.

Although FIG. 1 depicts application switch 142 residing on the application hosts 110, the application switch may reside on a network device such as a router, switch, or bridge in other embodiments. The steps performed by the application switch 142 according to an embodiment are described in more detail below with reference to FIG. 2.

Example Servers and Requests

For purposes of illustrating a simple example of use of an embodiment, each of the servers 121, 122, 123 is assumed to provide stock price quotes in response to requests formatted according to SOAP. The SOAP requests indicate the stocks and the time for which price quotes are desired. Thus, the example servers 121, 122, 123 provide similar services, in the form of stock price quotes in response to SOAP requests received from a client, which requests identify the time and the stocks whose prices are to be quoted. All servers 121, 122, 123 are further assumed to find the stocks identified in the requests as stock ID objects in the Body of the SOAP message.

For purposes of illustration client 102 is assumed to comprise a personal stock portfolio (PSP) process that employs an extension to the stock quote service available from some servers connected to network 106. It is assumed that a server that supports the extension provides, in a response sent to the client, additional information for stocks that have changed by more than a threshold amount. This particular extension is referred to herein as the threshold extension. A server that supports the threshold extension obtains the last stock price from stock price objects in the request. Stocks are identified in the requests that employ the extension as stock ID objects within the stock price objects in the Body element of the SOAP message. It is further assumed that the third server 123 supports the threshold extension to the stock quote service.

Because the stock ID is stored differently in the Body of the SOAP requests that employ the threshold extension, the servers that do not support the threshold extension are not expected to function properly to find the stock ID objects. Thus, the client indicates that the threshold extension is mandatory for servers that process and respond to the request. In a SOAP message, this is indicated by including in a Header element of the SOAP envelope, a header entry element with a name for the extension, such as "Threshold," and a mustUnderstand attribute having a value of "1."

Functional Overview

Figure 2:
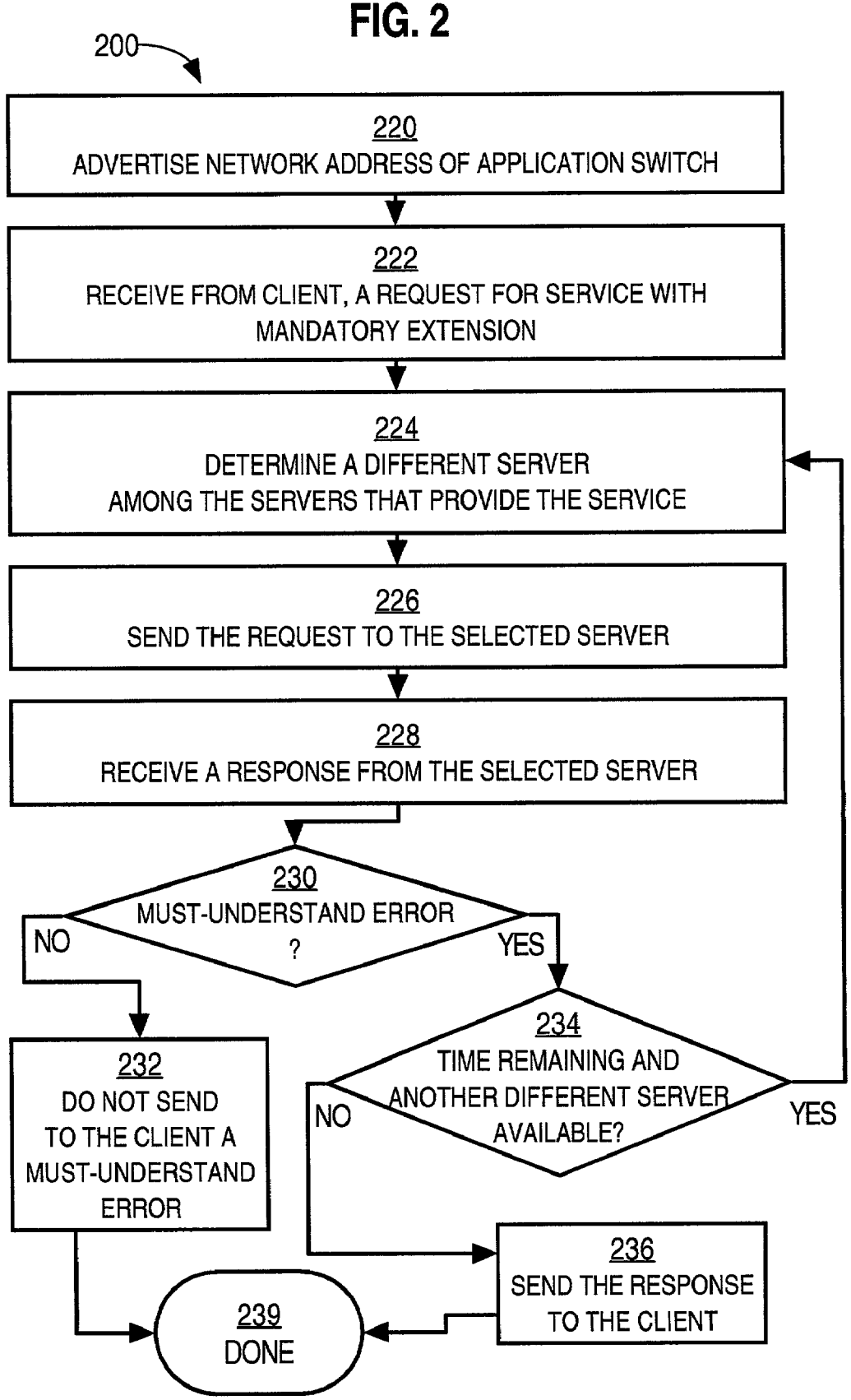
FIG. 2 is a flowchart that illustrates a high level overview of one embodiment of a method for masking version differences among the multiple applications.

FIG. 2 is a flowchart that illustrates a high level overview of one embodiment 200 of a method employed by the application switch 142 for masking version differences among multiple applications. Although steps are shown in FIG. 2 in a particular order, in other embodiments the steps may occur in a different order or overlapping in time.

In step 220, the entity that provides the servers advertises the network address of the application switch. For example, Company XYZ, which provides the stock quote SOAP-compatible servers 121, 122, 123, advertises the address, such as the URI, of the application switch 142. For purposes of illustration the application switch is assumed to have the URI of "XYZ.com/SOAPSQ/SQ" and the servers 121, 122, 123 have the URIs of "XYZ.com/SOAPSQ/SQ1," "XYZ.com/SOAPSQ/SQ2," and "XYZ.com/SOAPSQ/SQ3," respectively. Thus, when a user obtains and installs a personal stock portfolio client, such as PSP2, and registers with Company XYZ to provide stock quotes for the program PSP2, Company XYZ informs the user to connect to the server at XYZ.com/SOAPSQ/SQ. The information about the address can be passed in any manner. For example, the address of the application switch can be passed in information presented to the user with literature included with the client, or in a Web page, so that the user can enter the address through a dialog box of the client; or, the client connects with the domain XYZ.com and is automatically passed the address of the application switch.

In step 222, the application switch receives a request from the client for service. The request includes data indicating a particular service extension is mandatory. For example, a SOAP request is received by application switch 142 at XYZ.com/SOAP/SQ from the PSP2 client 102 with a header entry named "Threshold" having a mustUnderstand attribute value of "1", indicating that the threshold extension is mandatory to process the request.

In step 224, the application switch determines a different server than previously selected to satisfy the request among the multiple servers that provide the similar services. The first time that step 224 is executed after receiving a request, any of the servers is a "different" server. The application switch may implement any policy for determining a different selected server. For example, the initial different server can be determined in alphabetical order, or in another prescribed order, or randomly, or based on the address of the client, or based on a user identification of the user of the client. Subsequent different servers for the same request can be determined in alphabetical order, or in another prescribed order, or randomly. In some embodiments the application switch stores data identifying the request and the servers to which the request has been sent. For example, the data is stored in a cache in memory or on a persistent storage device that indicates the request received in step 222 and the initial server.

For purposes of illustration, it is assumed that the different server is selected to distribute the load approximately equally among the servers. It is assumed that the initial server selected for any request is different from the initial server selected for a previous request by moving in reverse order through the three servers 121, 122, 123. That is, the initial server selected for one request is 121, the initial server selected for the next request is 123, the initial server selected for the next request is 122, and so on. It is further assumed that a subsequent different server, if any, selected for a particular individual request is the next server in forward order 121, 122, 123, 121, 122, until the third and last server is selected for that particular request.

In the illustrated example, it is assumed that the application switch determines to select the first server 121 as the initial server for the SOAP request received in step 222. Data indicating the request, including the client 102, and the initial server, server 121, and any subsequent servers to which the request is sent, are stored in cache.

In step 226, the request is sent to the selected server by the application switch. For example, the application switch 142 sends the request to the first server 121 at XYZ.com/SOAPSQ/SQ1.

In step 228, the application switch receives a response from the selected server associated with the request. For example, the application switch 142 receives, from the first server 121 at XYZ.com/SOAPSQ/SQ1, a response associated with the request. Any manner may be used to associate the response with the request, such as comparing the destination port and address fields in the TCP/IP packet received.

In step 230, the application switch determines whether the response indicates an error because the mandatory extension is not available at the selected server. That is, the application server determines whether the response includes error data indicating that the mandatory extension is not available. For example, the application switch 142 determines whether the response includes a SOAP mustUnderstand error for the Threshold header entry. For purposes of illustration, it is assumed that only server 123 understands the threshold extension. Therefore, the response from server 121 will include a SOAP mustUnderstand error for the threshold extension represented by the Threshold header entry.

If it is determined in step 230 that the response does not indicate an error for lacking the mandatory extension, control passes to step 232. In step 232, the response is forwarded to the client that sent the request associated with the response. No response with an error indicating lack of a mandatory extension is forwarded to the client. In some embodiments, during step 232, data in cache that identifies the request and an initial server and any subsequent servers to which the request has been sent is purged to make room for other data. In some embodiments such data is also purged when a time out period has expired.

For example, a SOAP response from server 123 without a mustUnderstand error includes a SOAP Body with stock price data objects containing the stock prices at the time specified in the request, and is forwarded to the PSP client by the application switch. The response does not have a mustUnderstand error. Processing of the request by the application switch is then complete as represented by passing control to step 239 indicating the processing is "done."

If, however, it is determined in step 230 that the response indicates an error for lacking the mandatory extension in the selected server, control passes to step 234. For example, control passes to step 234 when the application switch determines in step 230 that the response from server 121 includes a SOAP mustUnderstand error. Instead of forwarding the response with such an error to the client, the application switch determines, in step 234, whether another server is still available that provides a similar service. For example, the application switch 142 determines whether any of servers 121, 122, 123 have not yet been sent the request received in step 222. In some embodiments the application switch checks the cache for data identifying the request and the servers to which the request has been sent.

If no other server is available, that is, if all the servers providing the similar services have already been sent the request, then no server of the application hosts can satisfy the request, and control passes to step 236. For example, if only server 121, which does not understand the threshold extension, resides on the application hosts 110, then control would pass to step 236.

In step 236, a response is sent to the client indicating an error because a mandatory extension is lacking. Processing of the request by the application switch is then complete, as represented by passing control to step 239 indicating the processing is "done." In this case, the system has been unable to mask the difference between the version of the servers on the application hosts and the version needed by the client. For example, if only server 121 resides on the application hosts 110, the response from server 121 with the mustUnderstand error for the threshold extension is sent to the client 102. The system 100 is unable, in this case, to mask the difference between the versions of the stock quote servers on the application hosts 110 and the version with the extensions needed by the client PSP2.

If, however, it is determined in step 234 that another server is available, then control passes back to step 224 to select another server to which to send the request. For example, the cache is checked to determine that the request has only been sent to server 121, and that servers 122 and 123 are therefore still available. Control then passes to step 224 to select one of the servers 122, 123 different from the server 121 to which the request has already been sent.

Steps 224 to 234 are repeated until control passes to step 232 or to step 236. Control passes to step 232 when a server is found that returns a response without an error because the mandatory extension is lacking. When a timeout period is exceeded, the most recent response is sent to the client, even if it is a mustUnderstand error. Control passes to step 236 when all servers providing similar services have been sent the request and all indicate the mandatory extension is lacking.

When control passes to step 232, versions differences due to servers that lack the mandatory extension are hidden ("masked") from the client because at least one of the servers providing the similar services includes the mandatory extension.

For example, control passes to step 224 to select one of the servers 122, 123 different from the server 121 to which the request has already been sent. In the second performance of step 224, it is determined to select the server 122, the next server in forward order; and server 122 is added to the data in cache associated with the request from client 102. In the second performance of step 226, the request from client 102 is sent to the second server 122. In the second performance of step 228, a response is received from the second server 122. The second server 122 does not understand the threshold extension, so the response includes a mustUnderstand error. In the second performance of step 230, it is determined that a mustUnderstand error is included, so control passes to step 234. In the second performance of step 234, it is determined that server 123 is still available, because the cache shows the request was sent already only to servers 121 and 122. Control then passes to step 224 for a third time.

Continuing with the same example, control passes to step 224 to select one of the servers different from the servers 121, 122 to which the request has already been sent. In the third performance of step 224, it is determined to select the server 123, the next server in forward order; and server 123 is added to the data in cache associated with the request from client 102. In the third performance of step 226, the request from client 102 is sent to the third server 123. The third server 123 understands the threshold extension and generates a response with the stock price quotes in the body of a SOAP message. There is no mustUnderstand error in the SOAP response from the third server 123. In the third performance of step 228, a response is received from the third server 123. In the third performance of step 230, it is determined that no mustUnderstand error is included, so control passes to step 232. In step 232, the response is sent to the client 102. Also in step 232, the data indicating the request and the servers 121, 122, 123 to which the request has been sent is purged from cache by the application switch. No mustUnderstand error message is sent to the client 102. As a result, versions differences due to servers 121, 122, which lack the mandatory threshold extension, are masked from the client 102. The client does not find out about servers 121 or 122. Instead, the client only sees a successful response from the server 123 that includes the threshold extension.

While the foregoing description presents a relatively simple example of masking a mustUnderstand error, embodiments can mask mustUnderstand errors without any component knowing the internal characteristics of the servers. For example, there can be many servers with complex collections of functions implemented on some servers but not others, and embodiments of the invention can hide that complexity.

Hardware Overview

Figure 3:
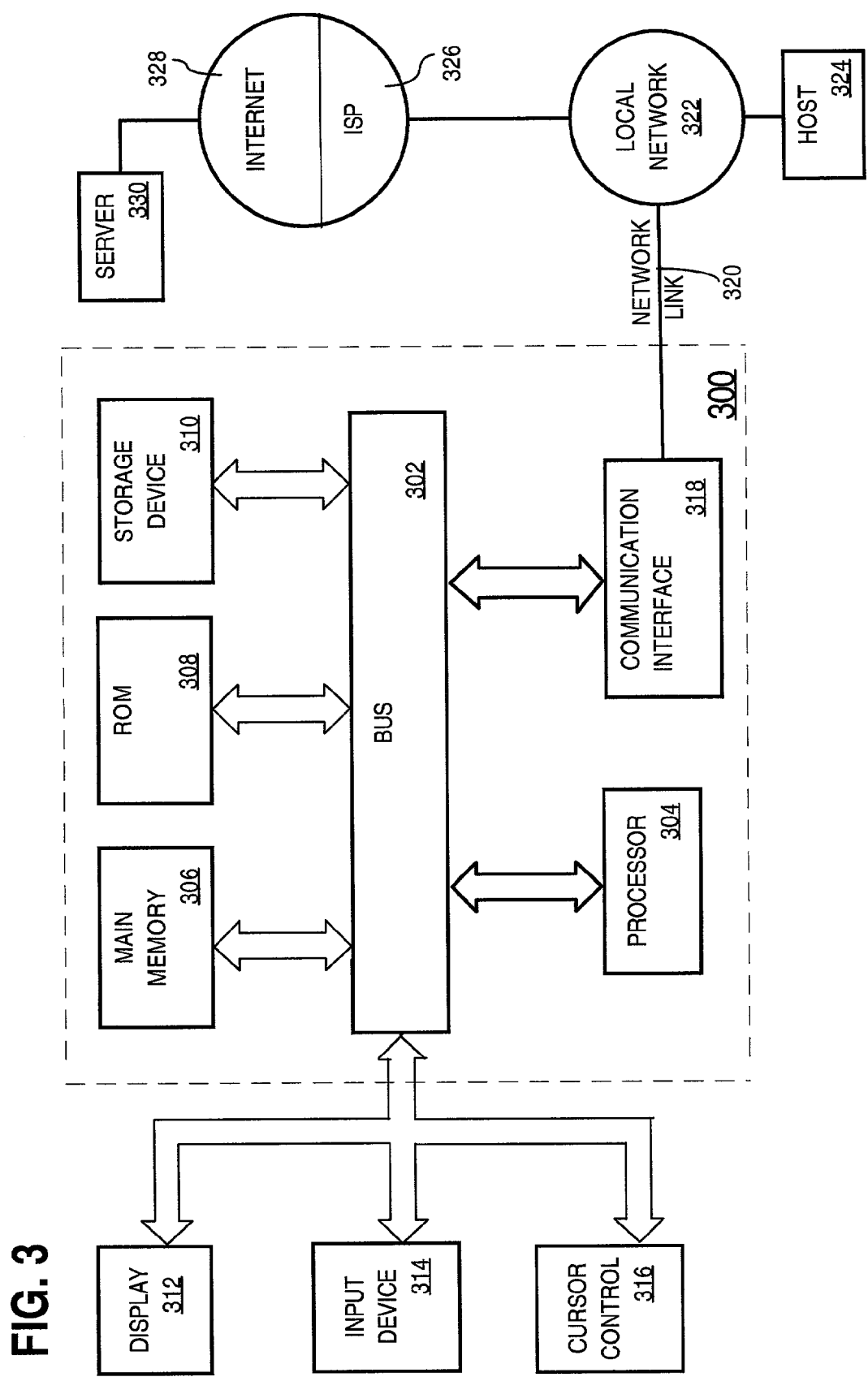
FIG. 3 is a block diagram that illustrates a computer system upon which an embodiment may be implemented.

FIG. 3 is a block diagram that illustrates a computer system 300 upon which an embodiment of the invention may be implemented. Some embodiments are implemented using one or more computer programs running on a network element such as a router device. Thus, in such an embodiment, the computer system 300 is a router.

Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

Processor 304 may execute the received code as it is received, and/or stored in storage device 310, or other non-volatile storage for later execution. In this manner, computer system 300 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for masking differences among a plurality of servers providing similar services over a network, the method comprising the steps of:
   receiving, at an application switching component from a requesting process, a request for a service among the similar services, wherein the request includes data indicating a particular service extension is mandatory;
   wherein said step of receiving the request for a service is performed by receiving a request formatted according to the Simple Object Access Protocol (SOAP);
   wherein the data indicating the particular service extension is mandatory is included in a mustUnderstand attribute associated with the particular service extension;
   wherein the application switching component is a process that switches among the plurality of servers;
   sending the request to a first server of the plurality of servers;
   receiving, at the application switching component in response to sending the request to the first server, error data that indicates the particular service extension is not available at the first server, wherein in response to receiving the error data from the first server the application switching component does not send the error data to the requesting process; and
   in response to receiving the error data, sending the request from the application switching component to a second server of the plurality of servers, wherein the second server is different from the first server.

2. A method as recited in claim 1, further comprising the steps of:
   determining at the application switching component whether none of the plurality of servers has the particular service extension; and
   if it is determined that none has the particular service extension, then sending, to the requesting process, error data indicating the particular service extension is not available.

3. A method as recited in claim 2, further comprising the step of:
   if it is determined that at least one of the plurality of servers has the particular service extension, then not sending, to the requesting process, error data indicating the particular service extension is not available.

4. A method as recited in claim 1, further comprising the step of:
   sending to the requesting process advertising data indicating that another service that appears to be assembled out of the similar services is available at a network address of the application-switching component.

5. A method as recited in claim 1, further comprising the steps of:
   determining at the application switching component whether a timeout period has occurred; and
   if the timeout period has occurred, then sending, to the requesting process, error data indicating that the particular service extension is not available.

6. A computer-readable storage medium carrying one or more sequences of instructions for masking differences among a plurality of servers providing similar services over a network, wherein execution of the one or more sequences of instructions by one or more processors causes the one or more processors to perform the steps of:
   receiving, at an application switching component from a requested process, a request for a service among the similar services, wherein the request includes data indicating a particular service extension is mandatory;
   wherein said step of receiving the request for a service is performed by receiving a request formatted according to the Simple Object Access Protocol (SOAP);
   wherein the data indicating the particular service extension is mandatory is included in a mustUnderstand attribute associated with the particular service extension;
   sending the request to a first server of the plurality of servers;
   receiving, at the switching component in response to sending the request to the first server, error data that indicates the particular service extension is not available at the first server, wherein in response to receiving the error data from the first server the application switching component does not send the error data to the requesting process; and
   in response to receiving the error data, sending the request to a second server of the plurality of applications, wherein the second server is different from the first server.

7. A computer-readable storage medium as recited in claim 6, wherein execution of the one or more sequences of instructions by one or more processors further causes the one or more processors to perform the steps of:
   determining whether none of the plurality of servers has the particular service extension; and
   if it is determined that none has the particular service extension, then sending, to the requesting process, error data indicating the particular service extension is not available.

8. A computer-readable storage medium as recited in claim 7, wherein execution of the one or more sequences of instructions by one or more processors further causes the one or more processors to perform the step of:
   if it is determined that at least one of the plurality of servers has the particular service extension, then not sending, to the requesting process, error data indicating the particular service extension is not available.

9. A computer-readable storage medium as recited in claim 6, wherein execution of the one or more sequences of instructions by one or more processors further causes the one or more processors to perform the step of:
   sending to the requesting process advertising data indicating that another service that appears to be assembled out of the similar services is available at a network address of the application switching component.

10. A computer-readable storage medium as recited in claim 6, wherein execution of the one or more sequences of instructions by one or more processors further causes the one or more processors to perform the steps of:

determining at the application switching component whether a timeout period has occurred; and if the timeout period has occurred, then sending, to the requesting process, error data indicating that the particular service extension is not available.

11. An apparatus for masking differences among a plurality of servers providing similar services over a network, comprising:

means for receiving from a requesting process a request for a service among the similar services, wherein the request includes data indicating a particular service extension is mandatory;

wherein said means for receiving the request for a service includes means for receiving a request formatted according to the Simple Object Access Protocol (SOAP);

wherein the data indicating the particular service extension is mandatory is included in a mustUnderstand attribute associated with the particular service extension;

means for sending the request to a first server of the plurality of servers;

means for receiving error data that indicates the particular service extension is not available at the first server, wherein in response to receiving the error data from the first server the error data is not sent to the requesting process; and means for sending the request to a second server of the plurality of servers in response to receiving the error data, wherein the second server is different from the first server.

12. An apparatus as recited in claim 11, further comprising:

means for determining at the application switching component whether none of the plurality of servers has the particular service extension; and means for sending to the requesting process, only if it is determined that none has the particular service extension, error data indicating the particular service extension is not available.

13. An apparatus as recited in claim 11, further comprising:

means for sending to the requesting process advertising data indicating that another service that appears to be assembled out of the similar services is available at a network address of the apparatus.

14. An apparatus as recited in claim 11, further comprising:

means for determining whether a timeout period has occurred; and means for sending, to the requesting process, if the timeout period has occurred, error data indicating that the particular service extension is not available.

15. An apparatus for masking differences among a plurality of servers providing similar services over a network, comprising:

a network interface that is coupled to the network for receiving requests from a requesting process;

a processor connected to the network interface;

one or more stored sequences of instructions which, when executed by the processor, cause the processor to carry out the steps of:

receiving from the requesting process a request for a service among the similar services, wherein the request includes data indicating a particular service extension is mandatory;

wherein said step of receiving the request for a service is performed by receiving a request formatted according to the Simple Object Access Protocol (SOAP);

wherein the data indicating the particular service extension is mandatory is included in a mustUnderstand attribute associated with the particular service extension;

sending the request to a first server of the plurality of servers;

receiving error data that indicates the particular service extension is not available at the first server, wherein in response to receiving the error data from the first server the error data is not sent to the requesting process; and sending the request to a second server of the plurality of servers, wherein the second server is different from the first server.

16. An apparatus as recited in claim 15, wherein execution of the one or more sequences of instructions by one or more processors further causes the one or more processors to perform the steps of:

determining whether none of the plurality of servers has the particular service extension; and if it is determined that none has the particular service extension, then sending, to the requesting process, error data indicating the particular service extension is not available.

17. An apparatus as recited in claim 15, wherein execution of the one or more sequences of instructions by one or more processors further causes the one or more processors to perform the step of:

if it is determined that at least one of the plurality of servers has the particular service extension, then not sending, to the requesting process, error data indicating the particular service extension is not available.

18. An apparatus as recited in claim 15, wherein execution of the one or more sequences of instructions by one or more processors further causes the one or more processors to perform the step of:

sending to the requesting process advertising data indicating that another service that appears to be assembled out of the similar services is available at a network address of the apparatus.

19. An apparatus as recited in claim 15, wherein execution of the one or more sequences of instructions by one or more processors further causes the one or more processors to perform the steps of:

determining whether a timeout period has occurred; and if the timeout period has occurred, then sending, to the requesting process, error data indicating that the particular service extension is not available.

20. A method for masking differences among a plurality of computer program servers providing similar services over a network, the method comprising the steps of:

receiving, at an application switching component from a requesting client, a SOAP message that includes a request for a service among the similar services, wherein the request includes a mustUnderstand attribute indicating a particular service extension is mandatory;

wherein the application switching component is a process that switches among the plurality of servers;

sending the request to a first server of the plurality of servers;

receiving, at the application switching component in response to sending the request to the first application, a mustUnderstand error value that indicates the particular service extension is not available at the first server, wherein in response to receiving the error data from the first server the application switching component does not send the error data to the requesting client;

in response to receiving the error data, selecting a second server of the plurality of applications that is different from the first server; and sending the request from the application switching component to the second server.

21. A method as recited in claim 20, further comprising the step of sending a mustUnderstand error message to the requesting client only when no second server is capable of selection.

* * * * *